Figures 1, 2:
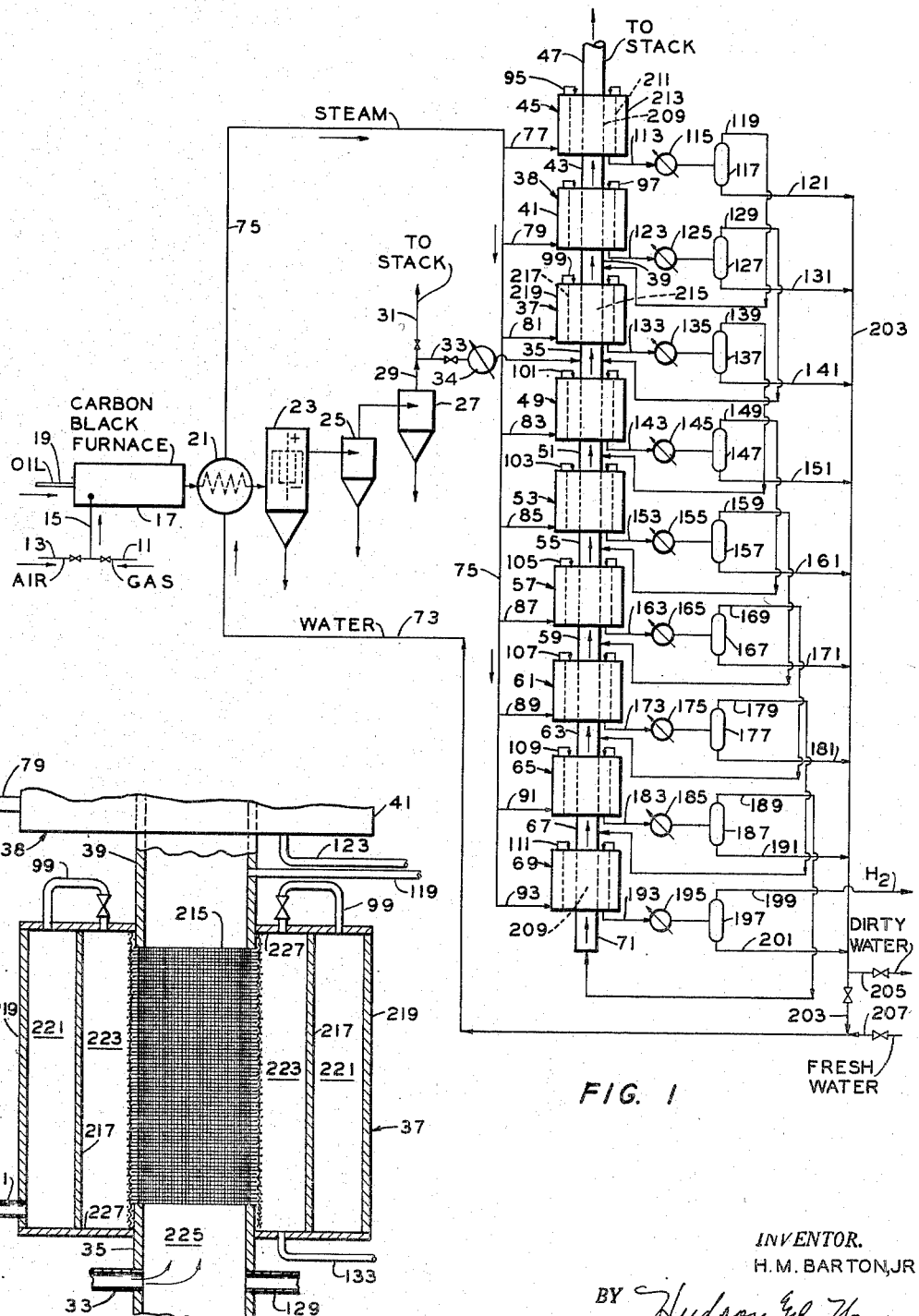

INVENTOR.
H. M. BARTON, JR

INVENTOR.
H. M. BARTON, JR.

United States Patent Office 2,699,836
Patented Jan. 18, 1955

2,699,836

SEPARATION OF GASES BY DIFFUSION

Hugh M. Barton, Jr., Bartlesville, Okla., assignor to Phillips Petroleum Company, a corporation of Delaware Application October 15, 1951, Serial No. 251,329

4 Claims. (Cl. 183—2)

This invention relates to an apparatus for separating gaseous mixtures into their component gases. In one aspect it relates to the separation of mixtures of gases according to the molecular weights of the constituent gases and apparatus therefor. In another aspect it relates to the separation of a gas of lower molecular weight from an admixture with a gas of higher molecular weight by atmolysis supplemented by thermal diffusion and apparatus therefor.

The process of atmolysis is described in the U. S. Bureau of Mines Bulletin 431, Mechanical Concentration of Gases, by C. G. Maier. The process described in this bulletin was patented by Maier in U. S. Patent 2,255,069, September 9, 1941. Maier's process is specifically a constant temperature operation.

Processes used for technically separating gases from gaseous admixtures involve chemical and/or physical principles and include (1) chemical means, (2) fractional condensation and/or fractional distillation, (3) preferential adsorption, and (4) diffusion. Fractional condensation may be subdivided to include preferential absorption in a liquid absorbent, and fractional condensation following compression and/or chilling to dew point temperatures. Chemical means involves consumption of chemicals and regeneration steps in case the chemicals can be recovered for reuse. Fractional condensation and/or distillation involve high pressures, refrigeration temperatures or both, while preferential adsorption ordinarily requires superatmospheric pressures, subatmospheric temperatures for the actual separation step and lower pressures and higher temperatures for absorbent regeneration. All-in-all, these conventional processes require substantial capital investments and operating costs are frequently prohibitively high.

I have devised a gas separation apparatus for separating and recovering certain gases from gaseous mixtures containing them, wherein high pressures and refrigeration temperatures are not required. For example hydrogen gas can be separated and recovered from admixture with methane, ethane, etc., or from admixture with nitrogen without the use of expensive superatmospheric pressures and low refrigeration temperatures.

My apparatus involves a combination of the principles of thermal diffusion and atmolysis type diffusion or diffusion across a porous barrier with the added step of using a sweep gas for maintenance of a proper concentration differential across the porous barrier.

The principles involved in diffusion processes are based on the kinetic theory of gases. According to this theory gaseous molecules are considered to be perfectly elastic bodies, which for convenience are considered as "spheres." These molecules are in a constant state of motion and are continually impinging against the walls of their container and against one another. The average speed of translation of the molecules between impacts is relatively great and for hydrogen gas for example, under atmospheric conditions is somewhat greater than one mile per second. Molecules of gases having unlike molecular weights possess unlike average speeds of translation, the molecules of the gas having the higher molecular weight possess a lower average speed of translation than the molecules of a gas having a lower molecular weight. For example, the molecules of carbon dioxide are considerably slower than the molecules of hydrogen under similar pressure and temperature conditions. Specifically, the relationship between the root-mean-square molecular velocities (average speed of translation between impacts) of two gases is, according to theory, inversely proportional to the square roots of their molecular weights. Thus, if a vessel contains gaseous oxygen and hydrogen and one wall is provided with an opening of diameter considerably less than the average distance between these molecules, there will be four times as many hydrogen molecules "diffuse" through the opening as oxygen molecules. The kinetic theory calls for $$\sqrt{\frac{32}{2}} = 4$$

times as many hydrogen as oxygen molecules to enter this small opening, or in other words a hydrogen molecule has four times the chance of an oxygen molecule to enter the opening.

The number of molecules passing through such an opening depends upon a number of factors, as temperature, pressure, etc. As temperature of a pure gas is increased the number of molecules entering such an opening is increased.

These statements hold for all gases irrespective of molecular weights. Thus, by increasing the pressure and temperature of a mixture of oxygen and hydrogen gases, molecules of both gases enter a capillary opening in increased numbers but always in the ratio of $$\sqrt{\frac{32}{2}} = 4$$

In other words an increase in pressure and/or temperature conditions increases the capacity of a given capillary.

If such a capillary tube connects two vessels containing gases, gaseous molecules from the vessels can enter their respective ends of the capillary and pass or diffuse through the capillary into the other vessel. Thus, like and unlike molecules may pass each other on their way to the other vessel. Speed of passage, for example, of a hydrogen molecule from one vessel to another is dependent upon the "concentration gradient" or in other words upon the difference in concentration of hydrogen molecules between the donor and recipient vessels. If the two vessels contain the same concentration of hydrogen molecules, hydrogen molecules will enter both ends of the connecting capillary in the same number and will pass through the capillary into the other vessel at the same rate. The net result is no change in the hydrogen concentration in either vessel. However, if one vessel contains hydrogen and the other vessel none, the rate of diffusion of hydrogen from the one to the other is a maximum.

As regards the small diameter capillary, there may be one capillary or many, such as would be provided by an unglazed porcelain plate or diaphragm. The capacity of a given diffusion operation is, obviously, directly proportional to the area of the capillary openings.

Thermal diffusion is based upon the principle that when a temperature differential exists across a zone and when a mixture of gases is contacted with the low temperature side, the lower molecular weight gas will preferentially pass through the zone in the direction of the higher temperature. The same general principles regarding relative rates of diffusion, concentration differential or gradient across a barrier apply to the process of thermal diffusion as well as to the above described diffusion process.

When a "sweep gas" or "carrier gas" is applied to the effluent side of a thermal diffusion porous barrier, the capacity of the diffusion process is markedly increased. The barrier in such a case may be unglazed porcelain or the like, a fine mesh wire screen or a perforate metal plate.

An object of my invention is to provide an apparatus for the separation of difficultly separable gases.

Another object of my invention is to provide an apparatus for the rapid separation of difficultly separable gases.

Still another object of my invention is to provide an apparatus for separation and recovery of free gaseous hydrogen from gaseous mixtures of hydrogen with other gases.

Yet another object of my invention is to provide an apparatus for the separation and recovery of hydrogen gas from admixture with other gases resulting from partial combustion of hydrocarbons.

And yet another object of my invention is to provide apparatus for the separation and recovery of hydrogen gas from admixture with other gases involved in the processing of hydrocarbons.

Still other objects and advantages of my apparatus will be realized upon reading the following description, which taken with the attached drawing forms a part of this specification.

Figure 3:
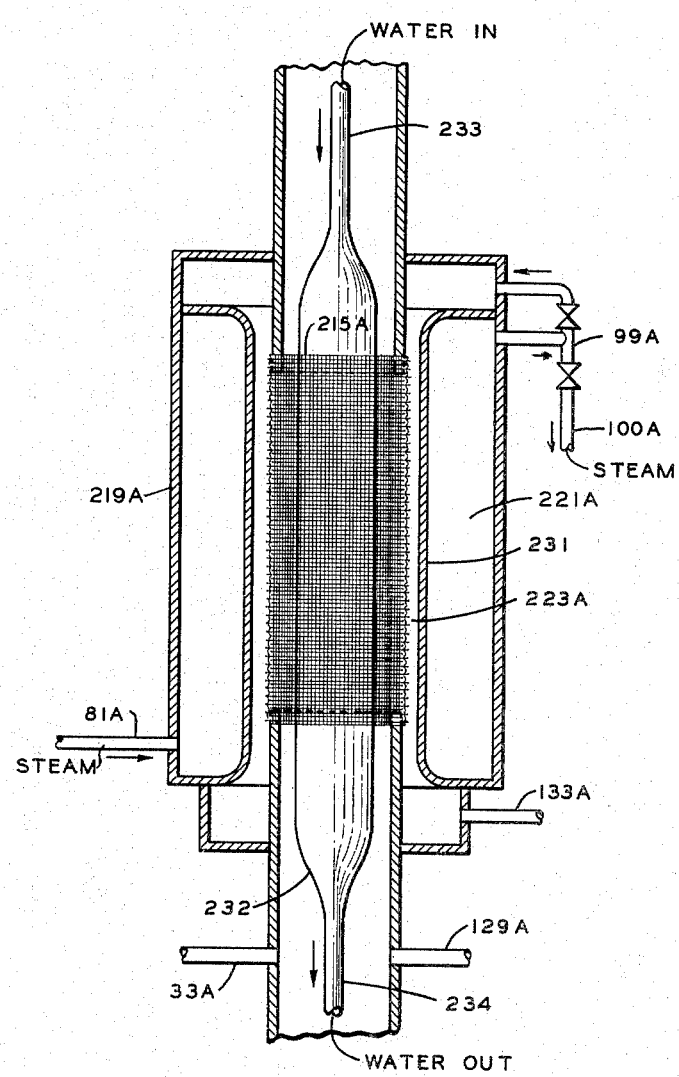

The process of my invention may be better understood upon reference to the accompanying drawing in which Figure 1 is a diagrammatic representation of one form of apparatus in which to carry out the process of my invention. Figure 2 is a diagrammatic representation, on an enlarged scale, of a portion of the apparatus of Figure 1. Figure 3 is a diagrammatic representation of another embodiment of my invention.

Referring now to the drawing and specifically to Figure 1, this embodiment represents the gas separation apparatus of my invention as applied to the recovery of hydrogen from the off-gases of a furnace carbon black manufacturing plant. In Figure 1 is illustrated an assembly of diffusion cells so arranged as to separate and recover hydrogen gas from the effluent gases of a furnace carbon black plant. In this illustration a carbon black producing furnace 17 is charged with a suitable hydrocarbon gas or vaporous oil charge stock from a conduit 19. For supplying heat for the elementary carbon producing reaction a combustible mixture of a fuel gas and air is introduced tangentially from conduit 15 into the reaction furnace. Air alone may be injected tangentially into the furnace through conduit 15, under which condition a portion of the vaporous oil charge stock from conduit 19 is burned to produce heat for converting the remainder of the charge oil to carbon. Air for this combustion operation originates from a source, not shown, and is conducted therefrom through a conduit 13 to the inlet conduit 15. When a fuel gas is used as a source of heat for the carbon producing operation, it is conducted from a source, not shown, through a pipe 11 to the conduit 15 in which it is mixed with the air prior to injection into the furnace. Hot gases of combustion containing elementary carbon in suspension are passed from the furnace 17 through a cooler and steam generator 21 into carbon black recovery units 23, 25 and 27. Unit 23 is preferably an electroprecipitator while units 25 and 27 are centrifugal separators.

The carbon producing furnace may be operated for the production of high quality carbon black and free hydrogen-containing combustion gases according to the methods described in U. S. Letters Patents 2,375,795, 2,375,796, 2,564,700 and Re. 22,886.

Cool flue gas, substantially free from suspended carbon issues from the final separator 27 through a conduit 29. When it is desired to vent these gases, they are passed through a conduit 31 to a stack, not shown. When my gas separation apparatus is in operation a valve in conduit 31 is closed and a valve in conduit 33 is opened and the gas passes through a cooler 34 prior to introduction into the first diffusion cell. By cooling the charge gas it is possible to maintain a greater temperature gradient across the thermal diffusion barrier.

I will explain the operation of a unit or cell of my apparatus, as illustrated in Figure 2 prior to further explanation of the operation of the recovery system.

Figure 2 is illustrative of a diffusion cell 37 which is so designed as to separate effectively free hydrogen gas from an admixture of gases such as that hereinabove mentioned as passing through conduit 29.

This diffusion cell 37 contains a porous membrane 215 which is the critical diffusion barrier of the apparatus. Attached to the top end of this barrier 215, which is preferably cylindrical in shape, is a cylindrical conduit 39 for passage of gases to the next upper cell, as a cell 41. Attached to the bottom end of the barrier 215 is a similar conduit 35 which conducts gases from any source into the barrier 215 for treatment therein. Surrounding this cylindrical barrier 215 is a gas-tight cylindrical wall 217 which is provided with gas-tight end closures 227. This wall 217 and closures 227 are arranged in such a manner as to provide an annular space 223 surrounding the barrier 215. In like manner, another cylindrical wall 219 surrounds the cylindrical shell 217 to provide an annular space 221 surrounding and separated from the annular space 223. A conduit 81 is provided for introduction of steam into the outer annular space 221. Several conduits 99 are provided for transfer of gas or vapor from the outer annular space 221 to the inner annular space 223. A conduit 133 is provided for removal of gas or vapor and diffusion gas from the inner annular space 223 to an apparatus for subsequent treatment and recovery of diffusion gas, not shown.

In the operation of such a diffusion cell as that illustrated in Figure 2, a gas to be separated into its constituent parts is introduced to the apparatus through an inlet line 33. This line 33 preferably contains a cooler 34 for further cooling the charge gas. Cooled gas from line 33 enters the conduit 35 and passes upward through the conduit 35 and axially through the cylindrical barrier element 215. Residual gas from the diffusion space exits from the end of the barrier 215 into the conduit 39 from which this gas passes into a second diffusion cell 38 (Figure 1) disposed directly above the diffusion cell 37. Upon passage of gas to be treated in cell 37 axially through the cylindrical barrier 215 the charge gases diffuse through the pores or openings in the barrier into the annular space 223. As explained hereinbefore the relative rates of diffusion of the gases through this barrier are in the ratio of 4:1 when hydrogen gas is being separated from admixture with free oxygen gas, the ratio of 4 being the square root of the ratio of the molecular weight of oxygen to that of hydrogen. The lower molecular weight gas diffuses the more rapidly, thus four molecules of hydrogen pass through the barrier per molecule of oxygen. However, in the case of off-gases from a carbon black producing plant such as that hereinabove mentioned and where hydrogen is to be recovered from effluent gases containing nitrogen, oxygen, carbon monoxide, carbon dioxide, and water vapor, hydrogen of course diffuses or passes through the membrane 215 at a faster rate than any of these other gases. The molecular weight of carbon monoxide is 28 and that of hydrogen is 2, and consequently hydrogen diffuses faster than carbon monoxide according to the square root of the inverse ratio of the molecular weights. Thus the relative rates of diffusion equals the square root of 28 divided by 2 which is about 3.74. Hydrogen will accordingly diffuse through this membrane 3.74 times as fast as will carbon monoxide, and hydrogen will diffuse faster than carbon dioxide in the ratio of the square root of their molecular weights, which is the square root of 44 divided by 2 which is about 4.69:1. This differential means that hydrogen will diffuse through the barrier about 4.69 times as fast as carbon dioxide. For water vapor, hydrogen will diffuse faster in the ratio of 3:1.

The rate of diffusion of hydrogen, for example through this barrier is dependent upon several factors, one of which is the concentration or partial pressure difference between the hydrogen within the barrier 215 and the hydrogen outside the barrier and within the annular space 223. This difference in partial pressure or concentration of a gaseous constituent on passage through the interstices of the barrier is spoken of as the concentration gradient. The greater the concentration gradient across the barrier, the greater is the rate of diffusion of a given gas through the barrier. Thus when the concentration of a gas being diffused on one side of a barrier is 0 the rate of diffusion is at a maximum for that particular gradient value. When the concentrations of a gas being diffused are the same on both sides of the barrier there is no net diffusion or net passage of that gas through the barrier. That is, there is no concentration change even though there is a passage of gaseous molecules in both directions.

High temperature steam is introduced into the apparatus of Figure 2 through a steam line 81 and this steam is intended to heat the cylindrical wall 217 of the inner annular space 223. When this wall 217 is maintained at a high temperature, for example 600° to 700° C. the rate of diffusion of such a gas as hydrogen through the walls of the porous membrane 215 is accelerated. The direction of passage of the gas of lower molecular weight is toward the area of increased temperature. Thus the rate of hydrogen diffusion is markedly increased when an appreciable temperature differential is maintained across the porous wall of the diffusion element 215. It is preferable to maintain the charge gases flowing upward through the space 225 into the diffusion element 215 at as low a temperature as possible while maintaining high temperature steam in the annular space 221. This type of diffusion is termed "thermal diffusion."

When the high temperature steam in the annular space 221 has expended a portion of its thermal energy in the manner just described, the steam is passed through conduits 99 into the inner annular space 223, this steam being removed through the conduit 133. The passage of the steam through the annular space 223 serves as a "sweep gas" or as a carrier gas for the removal of the diffused gas as rapidly as it enters this annular space 223. The drawing shows a countercurrent flow of steam and input gases for better separations, but it is understood that for some cases it may be necessary to use concurrent flow to obtain better pressure controls. As mentioned above, the rate of diffusion of a gas through a porous membrane is more rapid the greater the concentration gradient across the barrier. By removing or carrying away diffused hydrogen as rapidly as it enters the space 223 the rate of passage of the hydrogen through the interstices of the barrier is further increased. By maintaining the temperature of the wall 217 relatively high the rate of diffusion of the hydrogen through the interstices of the barrier is still further increased. And the combination of diffusion through the porous barrier with the use of a sweep gas supplemented by the thermal diffusion effects, provides a very rapid hydrogen separation process in which large volumes of hydrogen can be separated and recovered from free hydrogen containing gases. I prefer to use steam as the sweep gas since upon its condensation from the gaseous effluent passing through line 133, the diffused gases remain as the gaseous product of the process.

In C. G. Maier, U. S. Bureau of Mines Bulletin 431, page 25, is given test data in which hydrogen was separated and recovered from a hydrogen-nitrogen mixture having a hydrogen content of 26.6 per cent by the use of a 100-mesh screen as a diffusion boundary, considerable concentration of hydrogen gas was obtained in the diffused gaseous product. The following tabulation (from Maier, ibid., page 25) illustrates the operation of this constant temperature in which the temperature of the entire diffusion system was constant at about 150° C. By this term "constant temperature" is meant that there was no thermal gradient across the barrier. Steam at this temperature was used as a sweep gas for removing the hydrogen as fast as it appeared.

Diffusion boundary, 100-mesh screen
Feed gas, 26.6 per cent $H_2$ in $N_2$

|  | Feed gas liters per minute | Fraction in concentrate | $H_2$ in concentrate, per cent |
|---|---|---|---|
| Steam rate, 2.6 grams per minute | 0.727 | 0.377 | 37.9 |
|  | .724 | .250 | 44.2 |
|  | 1.141 | .370 | 37.9 |
|  | 1.068 | .220 | 44.2 |
|  | 1.110 | .077 | 52.6 |
|  | 0.355 | 0.366 | 37.1 |
|  | .679 | .568 | 34.0 |
|  | .636 | .101 | 51.2 |
| Steam rate, 3.8 grams per minute | .868 | .240 | 47.6 |
|  | 1.079 | .378 | 38.5 |
|  | 1.085 | .222 | 45.5 |
|  | 1.052 | .156 | 52.6 |

In a thermal diffusion operation of Rindtorff, German Patent 733,079, September 24, 1940, in which a temperature difference of 660° C. was maintained across a porous diffusion barrier, 120 liters of a charge gas containing 14 per cent hydrogen and 86 per cent nitrogen yielded 16 liters of a hydrogen concentrate containing 80 per cent hydrogen and 104 liters of a residue gas containing 96 per cent nitrogen. According to my operation and using the combination diffusion cell illustrated in Figure 2, I am able to recover a hydrogen concentrate of greater hydrogen content from the cell operating at a greater throughput of hydrogen containing gases undergoing treatment. In other words, my cell has greater capacity per cell than the expected combination of a simple porous barrier diffusion cell and a simple thermal diffusion cell. Regardless of the capacity of the given cell and of the rate of diffusion or the operation of the sweep gas in maintaining a maximum concentration gradient, gases diffuse through the membrane in the inverse ratio of the square root of their molecular weight. However by adequate pressure controls it is possible to increase the separation factor over the theoretical square root of molecular weight which applies only to pure diffusion. All of these operating factors merely increase the capacity of a cell. Thus, when hydrogen diffuses through the walls of the porous membrane 215 at a faster rate from a carbon black furnace gas, carbon monoxide, carbon dioxide, nitrogen and water vapors also pass through the membrane at faster rates. Since the residue gas from the cell 37 of Figure 2 will contain some hydrogen along with the other constituents, this gas then for further recovery of hydrogen is passed into a second diffusion cell 38 similar in all respects to cell 37. In this cell 38 the hydrogen, carbon monoxide, carbon dioxide and water vapor will diffuse through the porous membrane in the inverse ratio of the square root of their molecular weights, which operation means since hydrogen has the lowest molecular weight it will be concentrated in the diffused gases and the residue gas from this second cell 38 will be further depleted of its hydrogen content. If the residue gas from the second cell is treated in a third cell, further recovery of hydrogen will be accomplished.

The hydrogen content of the diffused gases from the second cell 38 may be about the same as the hydrogen content of the charge gases to the first cell 37, so that after condensation of the steam from the diffusion gases of the second cell 38 and separation of the condensate therefrom, the uncondensed gases are fed into the charge gases in conduit 225 through a conduit 129. After condensation of the steam content of the diffusion gases issuing from cell 37 through line 133 the hydrogen content of the uncondensed constituents is considerably greater than the hydrogen content of the gas charged to this cell and this concentrated hydrogen containing gas is fed to a cell 49 next lower in the series of cells illustrated in Figure 1 below cell 37. Thus this next lower cell 49 operating on a somewhat concentrated hydrogen containing feed stock operates to produce a further concentration of hydrogen and this further concentrated hydrogen after condensation of sweep steam is fed to a still next lower diffusion cell 53. Thus by serially further concentrating the hydrogen content of the diffusion gas a final high concentrate hydrogen containing gaseous product is removed from the system illustrated in Figure 1 through a conduit 199. The final residue gas, substantially completely depleted of its hydrogen content, is removed through the gas conduit 47 and passed to a stack or other disposal, not shown.

On reference to the apparatus of Figure 1, the cell 37 into which the original charge stock gas is introduced is equipped with a condenser 135 in conduit 133. Cooled fluid from condenser 135 passes on into a phase separator 137 in which condensed liquid water is separated from the uncondensed gases, the water passing through conduit 141 to a manifolded header line 203. The uncondensed gases containing the diffusion gases along with a small content of water vapor is passed from the separator 137 through line 139 into the feed pipe 51 of the next lower diffusion cell. It is understood that the condenser 135 and separator 137 may be combined in one unit.

I have attached reference numerals to each of the apparatus parts illustrated in Figure 1. The diffusion cells of Figure 1 are identified by reference numerals 45, 41, 37, 49, 53, 57, 61, 65 and 69. The conduit provided for carrying the diffusion effluent from the last cell to the stack and from each preceding cell to the next succeeding cell are identified respectively by reference numerals 47, 43, 39, 35, 51, 55, 59, 63, 67, and 71. Each of the respective cells is provided with diffusion gas and sweep gas removal conduits which are identified by reference numerals 113, 123, 133, 143, 153, 163, 173, 183 and 193. Each of these sweep gas and diffusion gas removal lines is connected with a condenser identified respectively by reference numerals 115, 125, 135, 145, 155, 165, 175, 185 and 195. In like manner each of these condensers is connected to a phase separator which is identified respectively by reference numerals 117, 127, 137, 147, 157, 167, 177, 187 and 197. From each of these phase separators is connected a liquid water withdrawal line identified respectively by reference numerals 121, 131, 141, 151, 161, 171, 181, 191 and 201. Each of these water withdrawal lines is connected to the above mentioned manifolded water header 203. Also from each of the phase separators is connected a gas removal line identified respectively by reference numerals 119, 129, 139, 149, 159, 169, 179, 189 and 199. The gas removal line 199 conducts the final concentrated hydrogen product from the system to such disposal as desired. All of the remaining gas removal lines from the respective phase separators conducts the separated hydrogen containing gaseous product from said separators to the next lower diffusion cell. Water from header 203 may contain some carbon black which was not removed in the electroprecipitator 23 or in the centrifugal separators 25 and 27, and this water is removed from the system through a line 205 for clarifying prior to reuse or to such disposal as desired.

Clarified or otherwise fresh water for production of sweep steam in steam generator 21 is introduced into the system through a line 207. This water passes from line 207 through line 73 into the steam generator 21. The steam passing therefrom is passed through header 75 for distribution to the individual steam take-off lines for the supply to each of the several diffusion cells. These individual steam lines taking off from the header 75 are identified by reference numerals 77, 79, 81, 83, 85, 87, 89, 91 and 93. From these several take-off steam lines the steam passes into the outer annular space of each cell corresponding specifically to the annular space 221 of cell 37 as illustrated in Figure 2. From this outer annular space this hot steam is passed into an inner annular space in direct contact with the several porous diffusion elements for use as sweep gas, as for example, through conduits 99 as illustrated in Figure 2. These several conduits for the several cells are identified by reference numerals 95, 97, 99, 101, 103, 105, 107, 109 and 111. The porous membranes in the upper diffusion cell 45 and the lower diffusion cell 69 of Figure 1 are identified by reference numerals 209.

In the operation of my invention as hereinabove explained, I can use for the porous membrane 215 of Figure 2 an unglazed porcelain member, a fine mesh wire screen or a perforated plate as long as the perforations are relatively small and of sufficient number to give an effectively large ratio of openings in the porous membrane. In case a perforated plate is used, the walls should be relatively thin so as not to restrict unduly gaseous diffusion. Thick walled diffusion membranes seriously impede the capacity.

When such a porous membrane as a ceramic element is used, some pressure differential may be imposed on either side of the membrane, if desired. However when too great a pressure is imposed on the inner surface of the porous element 215, the tendency is to force by fluid pressure all gaseous molecules through the membrane and thereby contaminating the diffusion gases. When such a porous element as a fine mesh screen, for example a 100 or finer mesh screen or a perforated plate is used as the porous membrane, substantially the same gaseous pressure must be maintained on both sides of this membrane to prevent entrance of unwanted molecules in the diffusion gas or to prevent repassage of diffused molecules back into the charge gas. In other words, when such a porous membrane is used as a screen or perforate plate, it is extremely important to maintain exactly the same pressure on both sides. However it has been found in simple diffusion operations that by maintaining a very slight increased pressure on the diffusion gas side of a membrane that the molecules of high molecular weight are impeded to a greater extent than are the molecules of the lower molecular weight gas, thus by maintaining a very, very slightly greater pressure in the annular space 223 of Figure 2 than in the space within the circumference of a porous element 215 on gaseous carbon monoxide, nitrogen, carbon dioxide and water, molecules are impeded in their flow by diffusion into the space 223. In this manner further concentration of hydrogen gas is obtained. By operating all of the diffusion cells of the system as illustrated in Figure 1 in this manner, a hydrogen concentrate product of remarkedly high hydrogen content is withdrawn from the system through line 199. The effluent gases from the treating system issuing from conduit 47 are remarkedly depleted from the hydrogen content.

In one embodiment of this invention in which a high temperature steam is used for maintaining a temperature differential across the porous membrane 215 and as a sweep gas, the annular space 221 may not be necessary and the steam from line 81 may be conducted directly into the annular space 223. In such an embodiment the outer surface of the wall 217 should be well insulated against loss of temperature so that an effective temperature differential may be maintained across the porous barrier without undue losses of heat to the atmosphere. However the embodiment illustrated in Figure 2 of the drawing, in which a steam chamber 221 is provided surrounding the annulus 223 is preferred. Obviously, surrounding the wall 219 is provided an insulation material so as to minimize losses of heat from this surface to the atmosphere.

Figure 3 illustrates a type of diffusion cell which may be used in place of the cell illustrated in Figure 2 of the drawing. In the cell of Figure 3 is a barrier of fine mesh screen 215A similar to barrier 223 of Figure 2. A wall 219A is an outer wall of a steam chamber 221A, which is bounded by an inner wall 231. Wall 231 in its upper curved section provides for streamlined flow of sweep vapor downward through space 223A adjacent the barrier 215A. When the annular space 223A is narrow, as shown, a minimum volume of sweep vapor is required while the sweeping effect and maintenance of the concentration gradient is a maximum. Inlet lines 33A and 129A are similar to inlet lines 33 and 129 of Figure 2. Conduit 99A provides for transmission of heating steam from space 221A to space 223A while line 81A is for introduction of steam into heating space 221A.

A cooling element 232 is provided as illustrated into which a coolant, such as water, is introduced through an inlet conduit 233 and from which the coolant is led by a conduit 234. A plurality of such cells as illustrated in Figure 3 may be used in a manner similar to the plurality of cells illustrated in Figure 1. When a plurality of cells of the type illustrated in Figure 3 are used, a cooler similar to cooler 232 may be used in each cell, or the cooler may be elongated to extend through the entire series of cells.

The use of such a cooler as cooler 232 makes it possible to maintain a greater temperature gradient across the barrier 215A than when such a cooler is not used. This type of cooler may be used in place of cooler 34 in line 33 or it is used preferably with cooler 34. By using cooler 34 and cooler 232 a still greater temperature gradient can be maintained across the barrier.

A line 100A is attached to line 99A as shown, so that steam may be added to the heating steam to furnish more sweep gas, or preferably to withdraw some heating steam prior to its use as a sweep gas. In this way the control of heating steam is independent of the sweep steam.

In one embodiment my invention comprises a method for separating a first gas from an admixture with other and higher molecular weight gases comprising introducing said admixture of gases into one end of a diffusion zone bounded by a porous thin walled and elongated diffusion barrier at a temperature slightly above 212° F., maintaining the outer surface of said diffusion barrier at a temperature above the aforesaid temperature by passing superheated steam in contact with the outer surface of said barrier, removing said superheated steam and diffused gas from said outer barrier surface, condensing the removed steam from the diffused gas and recovering the diffused gas as one product of the process and removing undiffused gas from the other end of said diffusion zone as a second product of the process.

In another embodiment the temperature difference maintained across the wall of the diffusion zone is 1080° F. and less with the temperature within the zone being maintained at a value of 212° F. and higher.

I have found that by employing a combination of a thermal diffusion operation with a conventional porous diaphragm diffusion operation and by employing a sweep gas in combination with these operations I am able to process relative large quantities of hydrogen containing gas for the concentration and recovery of hydrogen gas in a relatively pure form and with the loss of only minor amounts of hydrogen.

In an embodiment of my invention in which a perforate plate or perforate cylinder is used as a diffusion barrier, it is preferable to use a metal which is as thin as mechanically possible so that the molecules undergoing diffusion will have as short a distance as possible to travel before being swept away by the sweep gas. It is also preferred that the diameter of the perforations in such a diffusion membrane be about equal to the thickness of the metal.

When a fine mesh metal screen is used as the porous membrane it is preferred that the screen be rolled through a pair of rolls to cut down at least the thickness of the screen and increase the ratio of perforation diameter to length.

In this manner exceedingly close control of gaseous pressure on opposite sides of the diaphragm is somewhat simplified in that the pressure of the gas on opposite sides of the diaphragm may vary slightly.

When non-corrosive gases are treated in the apparatus of my invention most of the material of construction may be selected from materials of commerce. When acidic gases such as hydrogen sulfide are being treated, provision may need be made to retard or prevent corrosion of equipment. Corrosion in such a case may be magnified during condensation of the sweep gas containing diffusion gas and in the phase separators and all lines carrying liquid water.

Such auxiliary apparatus as valves, compressors, flow controllers and temperature and pressure recording and control equipment and the like, are not shown in the drawing or mentioned specifically in the specification for purposes of simplicity. The need for the use, and the installation and operation of such auxiliary equipment such as differential pressure operated flow control valves on line 99 is well understood by those skilled in the art.

My invention may be used not only for the separation of hydrogen from hydrogen containing gases, but it may be used for separation of, for example, carbon monoxide from mixtures of carbon monoxide and carbon dioxide, or in fact, for the separation of one or more gases of relatively low molecular weight from admixture with one or more gases of higher molecular weight. My process has wide application since it is dependent solely upon the property of molecular weight and not upon any other physical property of gases.

While certain embodiments of the invention have been described for illustrative purposes, the invention obviously is not limited thereto.

Having disclosed my invention, I claim:

1. An apparatus for recovering a first gas from admixture with a second gas comprising in combination, a hollow cylindrical diffusion barrier open at both ends, a cylindrical gas-tight shell surrounding and coaxial with said cylindrical barrier in such a manner as to provide an annular space of uniform width therebetween, means for introducing a fuel mixture of said first and second gases into one end of said cylindrical barrier, means for removing residual fuel gas from the other end of said cylindrical barrier, a steam conduit connected directly to the end of said cylindrical gas-tight shell adjacent said other end of said barrier for introducing steam into said annular space, a conduit connected to said cylindrical gas-tight shell for removing steam and gas from the end of said annular space adjacent said one end of said cylindrical barrier, a condenser connected with said means for removing steam and gas, and a liquid-gas phase separator for separating gas from water.

2. An apparatus for recovering a first gas from admixture with a second gas comprising in combination, a hollow cylindrical diffusion barrier open at both ends, a first cylindrical gas-tight shell surrounding said cylindrical barrier and coaxial therewith in such a manner as to form a first annular space of uniform width therebetween, a second cylindrical gas-tight shell surrounding said first cylindrical shell and coaxial therewith and in such a manner as to provide a second annular space therebetween, means to introduce feed gas to be separated into one end of said barrier, means to remove residue gas from the other end thereof, means to introduce steam into said second annular space, a conduit means connecting the second annular space with the first annular space at a point adjacent the other end of said barrier, a condenser, a conduit connecting said first annular space with said condenser, and a liquid and gas recovery means in communication with said condenser.

3. In the apparatus of claim 2, a cooler disposed within said hollow cylindrical barrier comprising an elongated, nonporous walled, hollow cylinder, the axis of which coincides with the axis of said barrier and the diameter of which is less than that of said barrier so as to provide an annular space therebetween, inlet means in one end and outlet means in the other end of said cooler for inlet and outlet, respectively, of cooling medium.

4. In the apparatus of claim 1, a cooler disposed within said hollow cylindrical barrier comprising an elongated, nonporous walled, hollow cylinder, the axis of which coincides with the axis of said barrier and the diameter of which is less than that of said barrier so as to provide an annular space therebetween, inlet means in one end and outlet means in the outer end of said cooler for inlet and outlet, respectively, of cooling medium.

References Cited in the file of this patent

UNITED STATES PATENTS

| | | |
|---|---|---|
| 2,255,069 | Maier | Sept. 9, 1941 |
| 2,494,554 | Harlow | Jan. 17, 1950 |
| 2,497,898 | McGurl | Feb. 21, 1950 |
| 2,540,152 | Weller | Feb. 6, 1951 |
| 2,584,785 | Bowman et al. | Feb. 5, 1952 |
| 2,609,059 | Benedict | Sept. 2, 1952 |

FOREIGN PATENTS

| | | |
|---|---|---|
| 266,396 | Great Britain | Feb. 23, 1927 |
| 291,576 | Great Britain | June 7, 1928 |
| 733,079 | Germany | Feb. 18, 1943 |

OTHER REFERENCES

Publication, Separation of Gas Mixtures by Mass Diffusion, Benedict et al., "Chemical Eng. Progress," v. 47, No. 3, p. 111.